UNITED STATES PATENT OFFICE.

NATHANIEL B. RICE, OF EAST SAGINAW, MICHIGAN.

IMPROVEMENT IN PROCESSES OF RECOVERING PHOSPHORIC ACID USED IN MANUFACTURE OF GELATINE.

Specification forming part of Letters Patent No. 194,050, dated August 14, 1877; application filed April 5, 1876.

*To all whom it may concern:*

Be it known that I, NATHANIEL B. RICE, of East Saginaw, in the county of Saginaw and State of Michigan, have invented an Improvement in the Method of Recovering Phosphoric Acid in the Process of Obtaining Gelatine from Bones, Horn-Pith, &c.; and I do hereby declare that the following is a full, clear, and exact description of the same.

This invention relates to an improvement in the process described in Letters Patent No. 114,602 granted to me May 9, 1871.

In carrying on the process set forth in said patent, I take one part of bone, horn-pith, or equivalent substance, or a sufficient amount to contain one part of phosphoric acid chemically combined with three parts of lime, and mixed with the gelatine. This material is placed in two parts of phosphoric acid, diluted with water, so as to contain from twelve to twenty-four per cent. acid, by which means all excepting the gelatine is dissolved, and by removing the gelatine there is left an acid phosphate of lime.

Now, in the treatment of this acid phosphate of lime by the process described in my patent, I subjected two-thirds of such acid phosphate of lime (having two parts of phosphoric acid) to the action of two parts of sulphuric acid, which cleared the phosphoric acid of lime, and precipitated the lime in the form of sulphate of lime or ordinary plaster. The precipitate, however, held a large amount of this free phosphoric acid, which would not drain out, and consequently I lost phosphoric acid at every operation.

I also found that if I treated the whole of the acid phosphate of lime with three parts of sulphuric acid, (a sufficient amount to precipitate the lime,) I could readily drain out two parts of the phosphoric acid, leaving the third part mixed with the sulphate of lime, but in this there was a corresponding loss in sulphuric acid.

The object, therefore, of my invention is to regain from the acid phosphate of lime all of the phosphoric acid for further treatment of bone, and make a great saving in sulphuric acid, and at the same time to produce from the residuum a valuable fertilizer.

In working my improved process I take the acid phosphate of lime resulting from the treatment of one lot of bone in diluted phosphoric acid, and add to the same a sufficient amount of sulphuric acid (three parts) to precipitate the lime. I then decant the supernatant liquid, which contains about two parts of the phosphoric acid. The sediment is a mixture of sulphate of lime and free phosphoric acid, the sulphate of lime holding the other third part of acid.

Now, in working a second lot of bone, I have a quantity of the phosphoric acid in solution, which contains the lime and has not been treated with sulphuric acid; and to separate the free phosphoric acid from the sulphate of lime, I leach the solution of acid phosphate of lime through the sediment, which carries off the phosphoric acid from the sulphate of lime and replaces it by an acid phosphate of lime, thus producing a residuum available as a valuable fertilizer.

This displacement or change may be effected in any other suitable manner, such as mixing the solution with the sulphate of lime (carrying the phosphoric acid) and decanting the liquid.

In the second lot of acid phosphate of lime (a part of which was used to replace the phosphoric acid in the sediment) there are contained about two parts of phosphoric acid, held by the lime, and about one part of free phosphoric acid, which was recovered from the sediment first treated. This lot will only take two parts of sulphuric acid to precipitate the lime, and the free phosphoric acid which remains in the sediment after the supernatant liquid is decanted is leached out by the third lot of acid phosphate of lime, in the same manner as described above. The lots of acid phosphate of lime are thus treated in succession, only requiring two parts of sulphuric acid (after the first lot is handled) to recover the entire amount of phosphoric acid in each.

Thus it will be seen that by my improved process a saving of at least one-third of sulphuric acid is made, and the residuum is converted into a valuable fertilizer.

What I claim as my invention is—

1. The process of recovering the free phosphoric acid contained in the sulphate of lime sediment by replacing the said phosphoric acid by an acid phosphate of lime, substantially as and for the purposes set forth.

2. In obtaining gelatine from bone, horn-pith, &c., by means of phosphoric acid, the process of treating the acid phosphate of lime to recover the phospheric acid therefrom, consisting in subjecting each lot to the action of sulphuric acid and then leaching a part or the whole of the next lot through the sediment, substantially as described.

NATHANIEL B. RICE.

Witnesses:
H. F. EBERT,
H. S. SPRAGUE.